(12) United States Patent
Yamamoto

(10) Patent No.: US 8,488,317 B2
(45) Date of Patent: Jul. 16, 2013

(54) IMAGE PICKUP APPARATUS AND ELECTRONIC DEVICE

(75) Inventor: Jiro Yamamoto, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/114,735

(22) Filed: May 24, 2011

(65) Prior Publication Data

US 2011/0310564 A1 Dec. 22, 2011

(30) Foreign Application Priority Data

Jun. 16, 2010 (JP) ................. 2010-137019

(51) Int. Cl.
*H05K 7/20* (2006.01)
*H04N 5/228* (2006.01)

(52) U.S. Cl.
USPC ...... 361/690; 348/208.99; 361/704; 361/707; 361/714; 361/715

(58) Field of Classification Search
None
See application file for complete search history.

(56) References Cited

FOREIGN PATENT DOCUMENTS

| JP | 2004-104632 | 4/2004 |
|---|---|---|
| JP | 2008-271571 | 11/2008 |
| JP | 2010-148024 | 7/2010 |

*Primary Examiner* — Gregory Thompson
(74) *Attorney, Agent, or Firm* — Cowan, Liebowitz & Latman, P.C.

(57) ABSTRACT

An image pickup apparatus that does not give a user, who grips an apparatus body with his/her hand when he/she uses the imaging apparatus or the electronic device, a sense of discomfort due to a heat, and that can efficiently diffuse heat generated from a heat source inside the apparatus body to suppress a local temperature rise inside the apparatus body. An image pickup apparatus comprises an outer cover that forms an exterior of a device body, the device body having a grip at one end thereof and having a heat source therein. A first thermal conductive path from a first circuit unit to a first heat storage member via a first heat conductive member and a second thermal conductive path from a second circuit unit to a second heat storage member via the second heat conductive member are separated from each other.

6 Claims, 4 Drawing Sheets

SUBJECT SIDE

IMAGE PICKUP APPARATUS AND ELECTRONIC DEVICE

BACKGROUND OF THE INVENTION

1. Field of the Invention

The present invention relates to an image pickup apparatus such as a digital camera or a digital video camera, and an electronic device.

2. Description of the Related Art

An image pickup apparatus such as a digital camera or a digital video camera has enhanced performance in recent years. With the enhanced performance, an amount of heat generated from an image pickup apparatus such as a CCD sensor or a CMOS sensor or from electronic components other than the image pickup device increases. Therefore, it is necessary to diffuse heat generated in the image pickup device or in the electronic components other than the image pickup device so as to suppress the temperature rise in the camera.

In view of these points, a technique described below has been proposed (Japanese Laid-Open Patent Publication (Kokai) No. 2008-271571). In this technique, a mounting plate having attached thereto a heat source such as an image pickup device or a liquid crystal display unit is brought into contact with an inner surface of an outer cover at a back surface through a heat conductive member, thereby allowing the heat generated in the image pickup device or in the liquid crystal display unit to be discharged to the outside from the outer cover.

Another technique described below has been proposed (Japanese Laid-Open Patent Publication (Kokai) No. 2004-104632). In this technique, a radiator plate, to which a heat source such as an image pickup device, a circuit board, and a liquid crystal display unit are integrally fixed, is fixed to an outer cover on a front surface and a back surface with a screw, thereby allowing the heat generated in the heat source such as the image pickup device, the circuit board, and the liquid crystal display unit to be discharged to the outside from the outer cover.

However, in Japanese Laid-Open Patent Publication (Kokai) Nos. 2008-271571 and 2004-104632, the heat generated in the heat source is directly transmitted to the outer cover from the heat conductive member or the radiator plate, which causes a user to feel a sense of discomfort due to the heat, when the user grips a camera body, especially a grip part, with his/her hand when he/she uses the imaging apparatus.

SUMMARY OF THE INVENTION

The present invention provides an image pickup apparatus and an electronic device that do not give a user, who grips an apparatus body with his/her hand when he/she uses the imaging apparatus or the electronic device, a sense of discomfort due to a heat, and that can efficiently diffuse heat generated from a heat source inside the apparatus body to suppress a local temperature rise inside the apparatus body.

In an aspect of the present invention, there is provide an electronic device comprising an outer cover that forms an exterior of a device body, the device body having a grip at one end thereof and having a heat source therein, the electronic device comprising: a first circuit unit that is disposed in the device body and generates heat during the device operation; a first heat storage member that is disposed in the device body on a side of the grip; a first heat conductive member that thermally connects the first circuit unit and the first heat storage member each other; a second circuit unit that is disposed in the device body and generates heat, an amount of which being greater than that of the first circuit unit, during the device operation; a second heat storage member disposed in the device body on a side opposite to the grip; and a second heat conductive member that thermally connects the second circuit unit and the second heat storage member each other, wherein a first thermal conductive path from the first circuit unit to the first heat storage member via the first heat conductive member and a second thermal conductive path from the second circuit unit to the second heat storage member via the second heat conductive member are separated from each other.

With this arrangement, it is possible to suppress a local temperature rise inside the apparatus body through the efficient diffusion of heat generated from the heat source inside the apparatus body, without giving a sense of discomfort to a user who grips the apparatus body with his/her hand, when he/she uses the apparatus.

Further features and advantages of the present invention will become apparent from the following detailed description of exemplary embodiments with reference to the attached drawings.

DETAILED DESCRIPTION OF THE EMBODIMENT

The present invention will now be described in detail with reference to the drawings.

Figure 1:
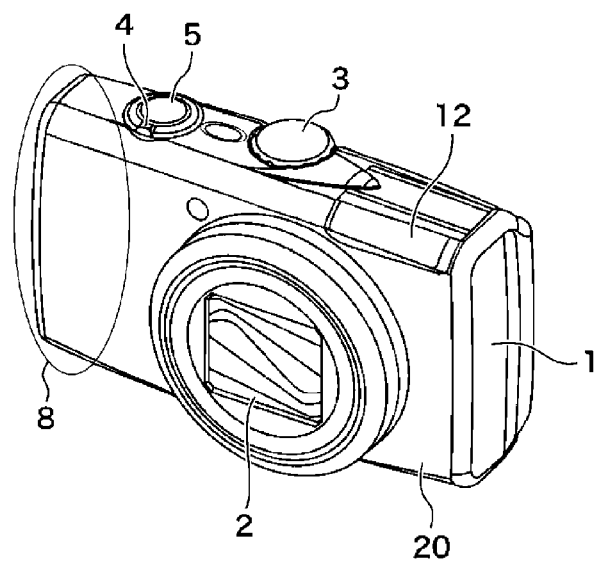
FIG. 1 is a perspective view showing a digital camera, serving as an image pickup apparatus according to an embodiment of the present invention, as viewed from the front.
Figure 2:
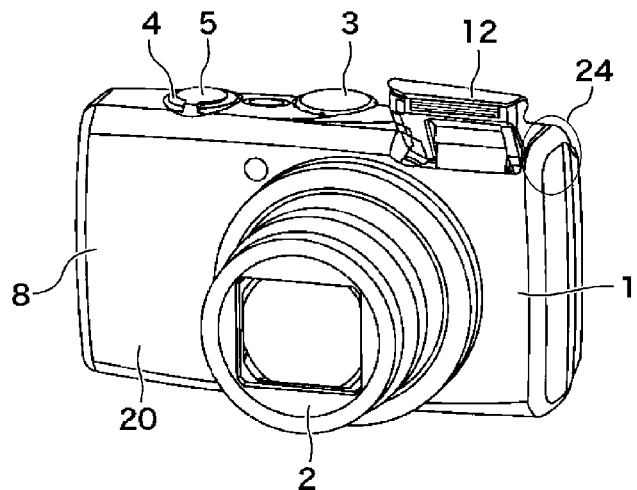
FIG. 2 is a perspective view of the digital camera of FIG. 1 with a lens barrel extended to a photographing position and a flash device opened.

FIG. 1 is a perspective view showing a digital camera, serving as an imaging apparatus according to an embodiment of the present invention, as viewed from the front, and FIG. 2 is a perspective view of the digital camera of FIG. 1 with a lens barrel extended to a photographing position and a flash device opened.

In the digital camera (image pickup apparatus, electronic device) in FIG. 1, an outer cover 20 forms an exterior of a camera body 1, which is one example of an apparatus body of the present invention as shown in FIGS. 1 and 2, and a lens barrel 2 is mounted on the front part (on a subject side) of the camera body 1.

The camera body 1 has a grip 8, which is gripped by a user with a hand during photographing, on a right side of the lens barrel 2 as viewed from the back of the camera body 1.

The camera body 1 also has a mode dial 3, which is used for switching various photographing modes such as a landscape mode, a portrait mode, and a moving-image mode, at substantially the center of a top surface of the camera body 1. On the top surface of the camera body 1, a release button 5 is disposed near the grip 8 with respect to the mode dial 3, while a flash device 12 is disposed on an opposite side of the grip 8 with respect to the mode dial 3. A zoom dial 4 for adjusting an angle of view is disposed around the release button 5.

Figure 3:
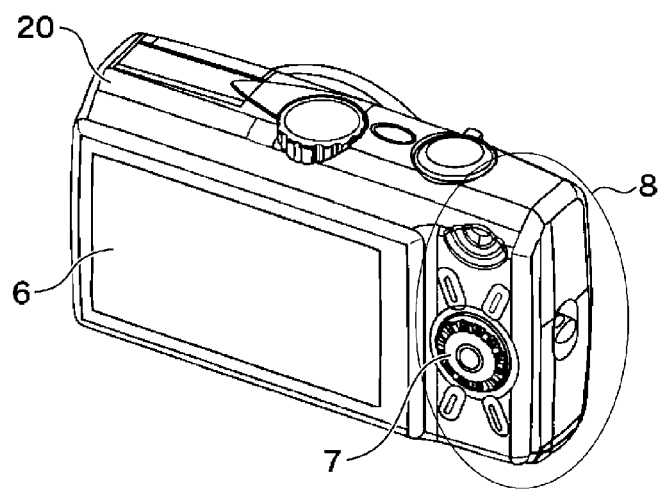
FIG. 3 is a perspective view of the digital camera of FIG. 1, as viewed from the back.

FIG. 3 is a perspective view of the digital camera of FIG. 1 as viewed from the back.

As shown in FIG. 3, a display 6 such as an LCD is disposed on the backside of the camera body 1. A user sees the display 6, to thereby confirm a through image or photographing preview image during photographing, or a photographed image during reproduction.

An operation button group 7 is disposed adjacently to the display 6 on the backside of the grip 8 of the camera body 1. The operation button group 7 includes a button for switching a flash light emission mode, an AF mode, and a drive mode during photographing, a button for feeding a photographed image to be displayed on the display 6 during reproduction, and a button for deleting the image data.

Figure 4:
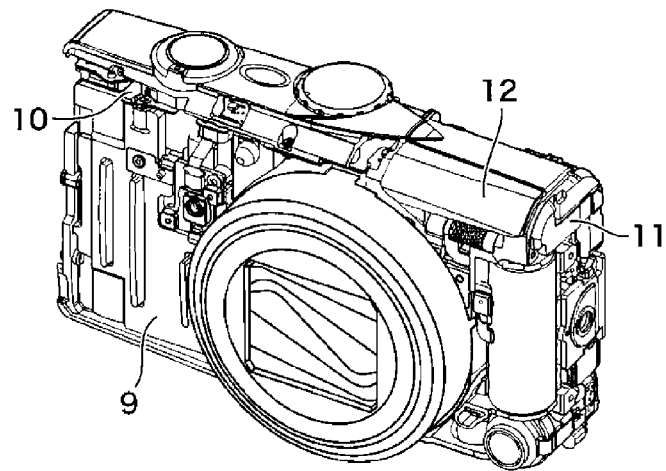
FIG. 4 is a perspective view of the digital camera of FIG. 1 with an outer cover on the front side and the backside, a display, and an operation button group removed.
Figure 5:
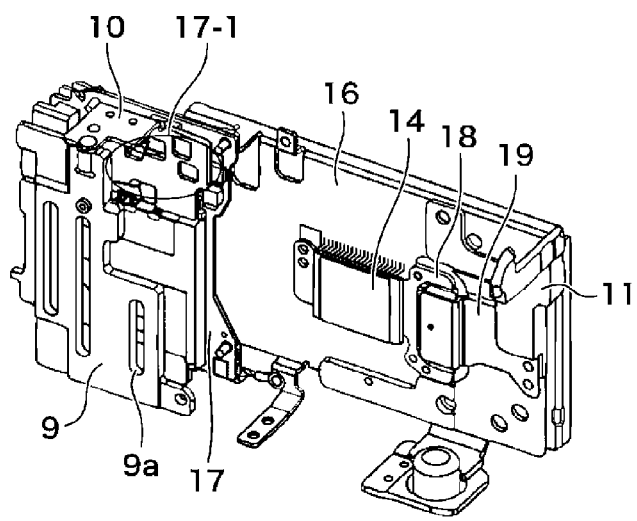
FIG. 5 is a perspective view of the digital camera of FIG. 4 with an outer cover at its top side, a lens barrel, a mode dial, a zoom dial, a release button, and a flash device removed.

FIG. 4 is a perspective view of the digital camera of FIG. 1 with the outer cover 20 on the front side and the backside, the display 6, and the operation button group 7 removed. FIG. 5 is a perspective view of the digital camera of FIG. 4 with the outer cover 20 at its top side, the lens barrel 2, the mode dial 3, the zoom dial 4, the release button 5, and the flash device 12 removed.

As shown in FIGS. 4 and 5, a heat storage member 9 made of, for example, an aluminum plate material having high thermal conductivity is disposed inside the camera body 1 near the grip 8. Similarly, a heat storage member 11 made of, for example, an aluminum plate material having high conductivity is disposed inside the camera body 1 near the flash device 12. The heat storage member 9 corresponds to a first heat storage member or a first heat sink according to the present invention, while the heat storage member 11 corresponds to a second heat storage member or a second heat sink according to the present invention.

A main substrate 17 is disposed on the backside of the heat storage member 9. The main substrate 17 has mounted thereon a power supply circuit 17-1 (first circuit unit) serving as a heat source when the digital camera is driven. One end of a heat conductive plate 10, which is made of copper or other material having high thermal conductivity, is thermally connected to the power supply circuit 17-1 via an elastic thermal conductive sheet (not shown), while the other end of the heat conductive plate 10 is thermally connected to the heat storage member 9. This enables heat generated from the power supply circuit 17-1 to be transmitted to the heat storage member 9 having high heat capacity via the heat conductive plate 10, with the heat diffused, which suppresses the local temperature rise of the power supply circuit 17-1 arranged inside the grip 8. A thermal conductive path from the power supply circuit 17-1 to the heat storage member 9 on a side of the grip 8 corresponds to a first thermal conductive path.

The heat storage member 11 is integrally fixed (thermally connected) to a heat conductive plate 16, serving as a chassis for holding the lens barrel 2 and the display 6. The heat conductive plate 16 is formed of a plate material having high thermal conductivity such as aluminum. An imaging device 14 (second circuit unit) such as a CCD sensor serving as a heat source during the operation of the digital camera is disposed at the center of the heat conductive plate 16 on the front side. When the digital camera is operated, a larger amount of heat is generated from the image pickup device 14 than from the power supply circuit 17-1.

The image pickup device 14 is fixed to a heat conductive plate 18. The heat conductive plate 18 is thermally connected to a heat conductive plate 19 via an elastic thermal conductive sheet (not shown). The heat conductive plate 19 is fixed (thermally connected) to the heat storage member 11. This enables heat generated from the imaging device 14 to be transmitted to the heat storage member 11 having high heat capacity, via the heat conductive plates 18 and 19, with the heat diffused, which suppresses the local temperature rise of the imaging device 14. A thermal conductive path from the image pickup device 14 to the heat storage member 11 via the heat conductive plates 18 and 19 corresponds to a second thermal conductive path.

Figure 6:
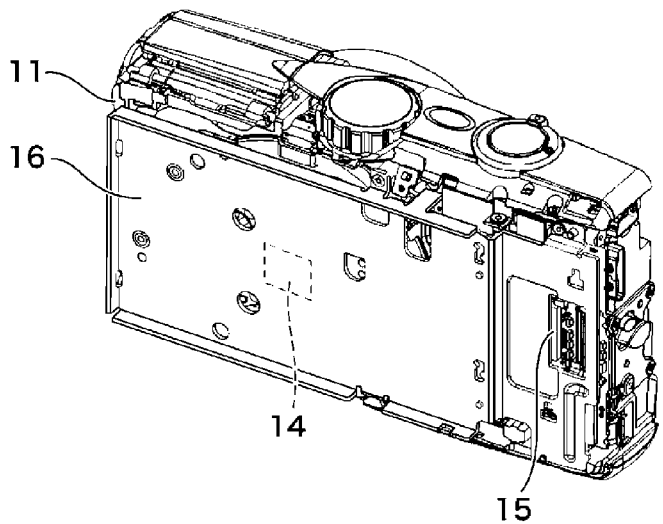
FIG. 6 is a perspective view of the digital camera of FIG. 4 as viewed from the back.
Figure 7:
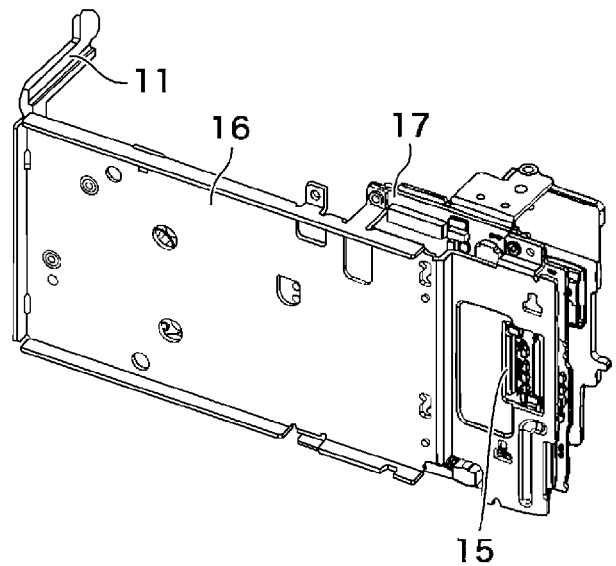
FIG. 7 is a perspective view of the digital camera of FIG. 5 as viewed from the back.

FIG. 6 is a perspective view of the digital camera of FIG. 4 as viewed from the back, and FIG. 7 is a perspective view of the digital camera of FIG. 5 as viewed from the back. As shown in FIGS. 6 and 7, an image processing unit 15 (third circuit unit), serving as a heat source when the digital camera is operated, is mounted on the backside of the main substrate 17. A larger amount of heat is generated from the image processing unit 15 than from the power supply circuit 17-1 when the digital camera is operated.

The image processing unit 15 is thermally connected to the heat conductive plate 16 via an elastic thermal conductive sheet (not shown). This enables heat generated from the imaging processing unit 15 to be transmitted to the heat storage member 11, integrally fixed (thermally connected) to the heat conductive plate 16 and having high heat capacity, via the heat conductive plate 16, with the heat diffused, which suppresses the local temperature rise of the image processing unit 15. A thermal conductive path from the image processing unit 15 to the heat storage member 11 via the heat conductive plate 16 corresponds to a third thermal conductive path.

Figure 8:
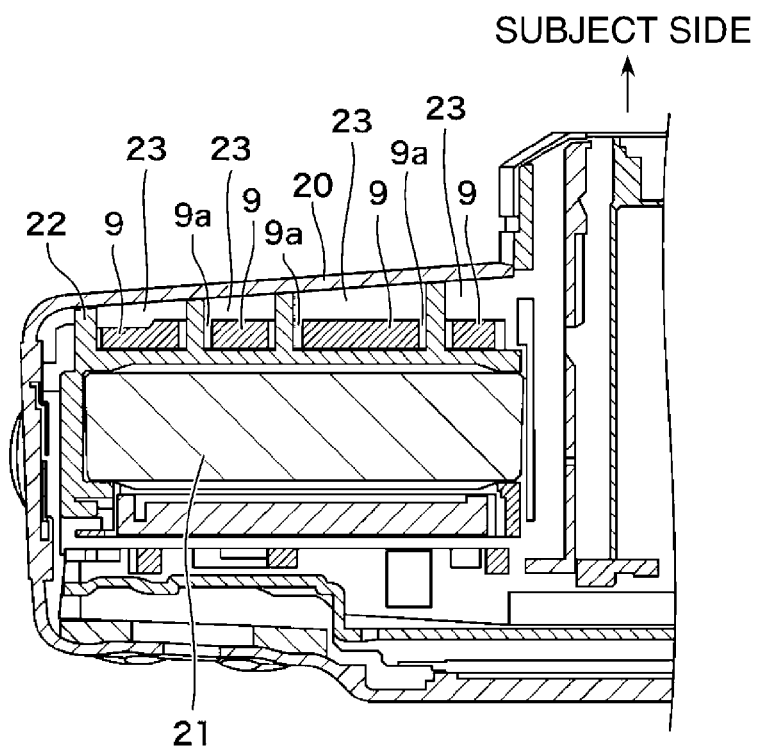
FIG. 8 is a sectional view of the digital camera of FIG. 1 on a side of a grip.

FIG. 8 is a sectional view of the digital camera of FIG. 1 on a side of the grip 8. As shown in FIG. 8, the heat storage member 9 is disposed apart from the inner surface of the outer cover 20, which forms an exterior of the grip 8 at the front side. A space 23 is formed between the heat storage member 9 and the inner surface of the outer cover 20, which prevents a high-temperature heat accumulated in the heat storage member 9 from being directly transmitted to the exterior of the grip 8.

A battery containing portion 22 for containing a battery 21, serving as a power source for the digital camera, is disposed between the heat storage member 9 and the main substrate 17. A wall of the battery containing portion 22 is made of a material such as a resin having a lower thermal conductivity than the heat storage member 9. A part of the wall penetrates a slit 9a formed in the heat storage member 9 and protrudes toward the outer cover 20. The protruding end is in contact with the inner surface of the outer cover 20, which enables the part of the wall of the battery containing portion 22 to bear an external force applied to the outer cover 20 at the grip 8 to thereby realize a required strength.

Figure 9:
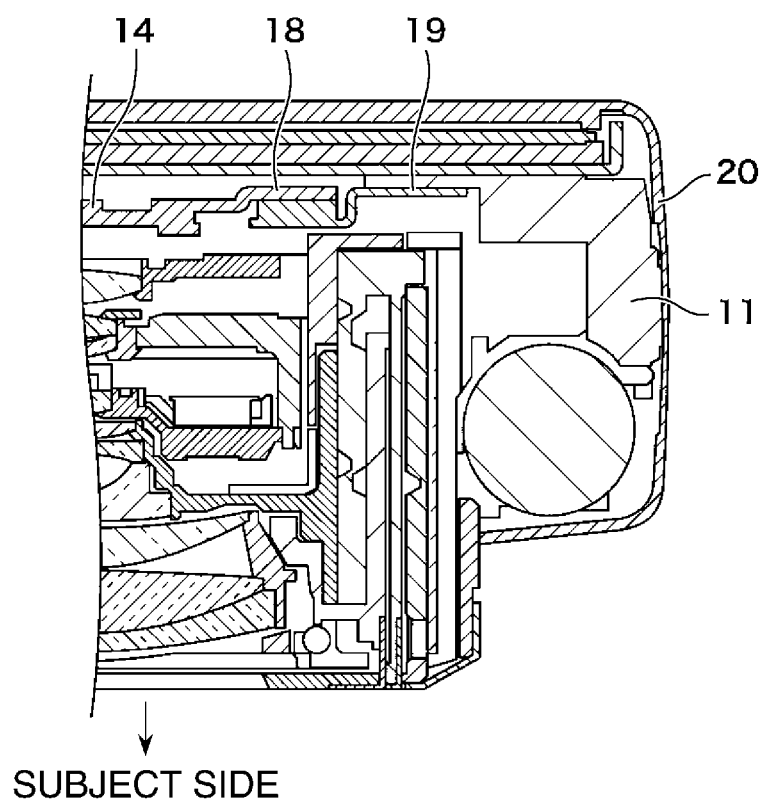
FIG. 9 is a sectional view of the digital camera illustrated in FIG. 1 on a side of a flash device.

FIG. 9 is a sectional view of the digital camera of FIG. 1 on a side of the flash device 12.

As described above, the heat generated from the image pickup device 14 is transmitted to the heat storage member 11 through the heat conductive plates 18 and 19. The heat generated from the image processing unit 15 is transmitted to the heat storage member 11 via the heat conductive plate 16. In this case, the heat generated from the imaging device 14 is not positively transmitted to the heat conductive plate 16. Similarly, the heat generated from the image processing unit 15 is not positively transmitted to the heat conductive plates 18 and 19. Therefore, there is no chance that the heat generated from the imaging device 14 is transmitted to the image processing unit 15 without passing through the heat storage member 11. Similarly, there is no chance that the heat generated from the image processing unit 15 is transmitted to the imaging device 14 without passing through the heat storage member 11.

The exterior on the flash device 12 is hardly touched by the user when the user uses the digital camera, and further, this portion is apart from the main substrate 17 having a large amount of heat generation, which suppresses the temperature rise of the exterior on the flash device 12 toward the exterior on the grip 8.

Accordingly, in the present exemplary embodiment, the heat storage member 11 is disposed as being in contact with the inner surface of the outer cover 20 forming the exterior on the side of the flash device 12 of the camera body 1. This enables the heat stored in the heat storage member 11 to be also transmitted to the outer cover 20, which enables the heat to be more effectively diffused, and furthermore enables a necessary strength to be secured.

In the present exemplary embodiment, the flash device 12 is adapted to automatically pop up (open) during the photographing. When the digital camera is dropped and an impact is applied to the digital camera with the flash device 12 popped up, an edge line 24 (see FIG. 2) between the space, which is openable to contain the flash device 12, and the side portion of the camera body 1 near the flash device 12 may be deformed.

In this case, the pop-up operation of the flash device 12 may not normally be performed. Therefore, in the present embodiment, the heat storage member 11 is disposed inside the exterior of the edge line 24 without forming any space. With this structure, a sufficient strength is secured to prevent the deformation of the edge line 24 caused by the impact of the drop of the digital camera.

As described above, in the present embodiment, the heat generated from the power supply circuit 17-1 is transmitted to the heat storage member 9 on a side of the grip 8 with the heat diffused, while the heat generated from the image processing unit 15 and the imaging device 14 is transmitted to the heat storage member 11 on a side of the flash device 12 with the heat diffused. This enables the heat generated from the heat source inside the camera body 1 to be efficiently diffused, which suppresses the local temperature rise inside the camera body 1.

In the present embodiment, the first thermal conductive path from the power supply circuit 17-1 to the heat storage member 9 on a side of the grip 8 and the second thermal conductive path from the image pickup device 14 to the heat storage member 11 on a side of the flash device 12 are separated from each other, and also the first thermal conductive path from the power supply circuit 17-1 to the heat storage member 9 on a side of the grip 8 and the third thermal conductive path from the image processing unit 15 to the heat storage member 11 on a side of the flash device 12 are separated from each other, which enables the heat generated from the heat source inside the camera body 1 to be more effectively diffused.

In the present embodiment, the space 23 is formed between the outer cover 20 forming the exterior of the grip 8 and the heat storage member 9 in order to prevent the high-temperature heat, stored in the heat storage member 9, from being directly transmitted to the exterior of the grip 8. This prevents the user, who grips the grip 8 of the camera body 1 with his/her hand when he/she uses the digital camera, from having a sense of discomfort due to the heat.

It is to be understood that the invention is not limited to the disclosed embodiments. The material, shape, size, manner, number, arrangement position, and the like can appropriately be modified without departing from the scope of the present invention.

For example, in the present embodiment, the heat storage member 11 on a side of the flash device 12 is brought into contact with the inner surface of the outer cover 20; however, the present invention is not limited thereto. A space may be formed between the heat storage member 11 and the outer cover 20, as is the case with the heat storage member 9 on a side of the grip 8.

In this case, the distance between the heat storage member 11 and the outer cover 20 can be made shorter than the distance between the heat storage member 9 near the grip 8 and the outer cover 20, since the temperature rise of the exterior on the flash device 12 is suppressed toward the exterior on the grip 8.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2010-137019, filed Jun. 16, 2010, which is hereby incorporated by reference herein in its entirety.

What is claimed is:

1. An electronic device comprising an outer cover that forms an exterior of a device body, the device body having a grip at one end thereof and having a heat source therein, the electronic device comprising:
   a first circuit unit that is disposed in the device body and generates heat during the device operation;
   a first heat storage member that is disposed in the device body on a side of the grip;
   a first heat conductive member that thermally connects the first circuit unit and the first heat storage member to each other;
   a second circuit unit that is disposed in the device body and generates heat, an amount of which being greater than that of the first circuit unit during the device operation;
   a second heat storage member disposed in the device body on a side opposite to the grip; and
   a second heat conductive member that thermally connects the second circuit unit and the second heat storage member to each other,
   wherein a first thermal conductive path from the first circuit unit to the first heat storage member via the first heat conductive member and a second thermal conductive path from the second circuit unit to the second heat storage member via the second heat conductive member are separated from each other.

2. The electronic device according to claim 1, further comprising:
   a third circuit unit that is disposed in the device body and generates heat during the device operation; and
   a third heat conductive member that thermally connects the third circuit unit and the second heat storage member to each other,
   wherein the first thermal conductive path from the first circuit unit to the first heat storage member via the first heat conductive member and a third thermal conductive path from the third circuit unit to the second heat storage member via the third heat conductive member are separated from each other.

3. The electronic device according to claim 2, wherein the second circuit unit is not thermally connected to the third heat conductive member, and the third circuit unit is not thermally connected to the second heat conductive member.

4. The electronic device according to claim 1,
wherein a distance between the second heat storage member and the inner surface of the outer cover of the device body on the side opposite to the grip is shorter than a distance between the first heat storage member and the inner surface of the outer cover of the device body on the side of the grip.

5. The electronic device according to claim 4, wherein a member having a lower thermal conductivity than the first heat storage member is disposed between the first heat storage member and the inner surface of the outer cover of the device body on a side of the grip as being in contact with the inner surface of the outer cover.

6. The electronic device according to claim 5, wherein the member having the lower thermal conductivity forms a part of a wall of a battery containing portion disposed inside the device body with respect to the first heat storage member, and the part of the wall penetrates a slit formed in the first heat storage member while protruding toward the inner surface of the outer cover.

* * * * *